United States Patent [19]
Paul

[11] Patent Number: 5,325,619
[45] Date of Patent: Jul. 5, 1994

[54] SELECTIVE EXCLUDING FISHING TRAWL DEVICE

[76] Inventor: Nelson G. Paul, 2216 Dobbin Pl., Raleigh, N.C. 27604-3878

[21] Appl. No.: 966,426

[22] Filed: Oct. 26, 1992

[51] Int. Cl.5 .............................................. A01K 73/02
[52] U.S. Cl. ........................................................ 43/9.2
[58] Field of Search ................... 43/9.1, 9.2, 9.95, 9.3

[56] References Cited

U.S. PATENT DOCUMENTS

| | | | |
|---|---|---|---|
| 4,356,654 | 11/1982 | Trekel | 43/9.1 |
| 4,805,335 | 2/1989 | West | 43/9.2 |
| 4,869,010 | 9/1989 | Saunders | 43/9.2 |
| 5,076,000 | 12/1991 | Anthony | 43/9.2 |
| 5,123,195 | 6/1992 | Hawkins | 43/9.2 |

OTHER PUBLICATIONS

World Fishing Article, Aug. 1967 p. 28.
World Fishing Articles, Jun. 1965 pp. 60–62, 96, 99.

*Primary Examiner*—P. Austin Bradley
*Assistant Examiner*—James Miner

[57] ABSTRACT

Fishing trawl device comprised of an outer net and inner net of differing mesh sizes that excludes undesirable objects and organisms incidental to trawling. The device consists of an outer net of net mesh size as may be necessary or legally prescribed to contain a particular species and an inner net of larger net mesh size relative to the netting comprising the outer net, as may be necessary or legally prescribed to filter and exclude objects or organisms. The outer and inner nets are joined at the forward extremity of the device and are connected at the aft end of the inner net to an opening in the body portion of the outer net by an inner tubular section of fabric or netting. The inner tubular section of fabric or netting prevents escape of the target species by protecting the opening in the body portion of the outer net, while facilitating the exclusion of objects or organisms.

5 Claims, 4 Drawing Sheets

SELECTIVE EXCLUDING FISHING TRAWL DEVICE

FIELD OF THE INVENTION

The present invention relates to a fishing trawl device for selectively excluding undesired marine objects and organisms from particular target species while harvesting.

BACKGROUND OF THE INVENTION

Trawling involves the deployment of a funnel shaped trawl net from a fishing vessel in the ocean to harvest marine organisms. The trawl net is suspended horizontally between opposite side paravane members (trawl boards), which cause the trawl net to assume a position suitable for fishing. The outward pitch of the opposite side paravane members relative to the towing force of the vessel, causes a hydraulic pressure that creates a substantial outward lateral force on the sides of the trawl net. This force holds the trawl net open and close to the sea bottom.

Typically, the constructions of trawl nets require a tubular, funnel-shaped section of net material, known as the trawl body. Lining the opening of the trawl body is a reinforcing rope, which also attaches the trawl net of the trawl doors. The upper reinforcing rope of the trawl is the headrope. This rope limits the outward lateral movement of the trawl boards. The limiting force of the headrope, combined with the hydraulic resistance of the trawl, causes the trawl to assume a horseshoe shape when viewed from the top. Furthermore, multiple floats lift the headrope and weights hold down the lower boundary rope, or footrope. These features serve to further spread open the mouth or collection portion of the trawl. Boundary ropes on either side of the trawl, or side ropes, connect the headrope with the footrope and reinforce the forward end of the trawl side panels.

At the central aft end of the trawl body, connects another tubular net section known as an extension. Connecting to the extension is a terminal tubular net section known as the cod-end or tailbag. The tailbag is of substantial construction and constricting lines restrain the tailbag opening, confining the catch while the trawl net is in operation.

The body of the trawl net serves to collect and guide objects and organisms, unable to avoid capture, through the extension into the tailbag. The extension adds length to the trawl net, adding significant handling characteristics to the retrieval and emptying of the tailbag while towing trawl nets "double-rigged" or with one trawl net on each side of the fishing vessel.

In fishing for a small crustacean, shrimp, for example, the mesh of the trawl net is typically small. Because a trawl net filters a substantial swath of the ocean, significant other objects and organisms are captured while trawling. These objects and organisms are either useless to the fisherman or protected by public law. For example, marine reptiles, such as sea turtles, are easily captured because they are unable to swim against the flow produced by the trawl towing speed. The National Marine Fisheries Service, a branch of the United States Government, has developed regulations (50 C.F.R. 217, 222 and 227) governing the use of trawl nets without certified turtle excluder devices (TED's). Said regulations significantly limit tow times for trawl nets not equipped with TED's. The increased need for retrieval and redeployment of the trawl net to release captured turtles increases the expense and labor of the fisherman. Besides this, trawl nets capture unwanted organisms, trash, litter, and other inanimate objects during the trawling operation. A trawl net device or apparatus providing the function of separating and excluding objects and other organism from the targeted species is of a necessity to fishermen using fishing trawls.

Such a trawl net device must positively exclude legally protected species, such as sea turtles, and simultaneously, fisherman must understand and safely handle the device. Preferably, the trawl net device should be constructed of soft, commercially available fabric or netting material. The trawl net device should not provide for openings in the collection areas through which the target species could escape.

Prior art includes metal and/or hard plastic devices installed in the collection areas of trawl nets. Such devices usually provide for an angled barrier of parallel bars that cause large objects and organisms to be forced upward or downward through a flap, door or other opening. Simultaneously, large amounts of the target species escape with the object or organism as it exits through the opening. Similar other devices substitute net webbing for the metal or plastic angled bars. In 50 CFR 22.772 (4) (ii) (G.) of the Federal Register (Vol. 55, No. 195, Tuesday, Oct. 9, 1990, Page 41090 and 41091), the Andrews TED uses a fabric barrier and provides an opening forward of the trawl extension. However, significant amounts of the target species escape through the unprotected opening in the outer trawl fabric.

Other devices are designed to exclude fish or other organisms with superior swimming ability. These devices provide for an opening in the top, side or bottom of the extension or tailbag portions of the trawl. Fish or other organisms escape, due to hydraulic variations produced by these devices in the trawling stream flow. Again, unprotected openings in the collection areas of the trawl, allow escape of the target species.

SUMMARY OF THE INVENTION

It is the purpose of the current invention to show an improved trawl net form that excludes turtles according to federal law and separates other objects and organisms from a target species during the trawling process. The object of this invention is a trawl net comprising an outer and inner net. The outer net is of a form and net mesh size as required or legally prescribed to provide for the capture of a particular target species. The inner net fits within the outer net. The net mesh size of the inner net is larger than the net mesh size of the outer net, as is necessary of legally prescribed to capture for exclusion, objects and species incidental to trawling. Said outer and inner nets are tubular in section view, funnel shaped in plan and profile view and are joined at the forward extremity of the trawl device. Furthermore, the inner net is fitted with an inner tubular section of fabric or netting at the trailing end. This inner tubular section of the device connects to an opening in the outer net body, forward of the extension and within the body of the portion of the outer net. This inner tubular section allows passage of separated objects to freedom on the outer side of the trawl net. In a typical construction of the invention, the inner tubular section is comprised of netting with the same size mesh as the outer net. In applications where it is desirable to increase the velocity of water through the inner tubular section in order to more effectively discharge organisms or objects collected by the inner net, an inner tubular section of waterproofed fabric is used in place of the netting. The inner tubular section prevents the escape of the target species by protecting the opening in the body portion of the outer net. The target species follow the inside edge of the outer net, around the inner tubular section of fabric or netting, to collection in the tailbag.

The exact apparatus configuration providing for such an effect may best be seen by the detailed description of the preferred embodiment as follows.

It is the object of this invention to provide a trawl net device for the positive capture and direct exclusion of objects and species incidental to fishing operations.

It is an additional object of this invention to provide a trawl net device for the exclusion of turtles (TED) and other marine organisms in conformance with public law.

It is a further object of this invention to provide a trawl net device which has substantially reduced loss of target species, while simultaneously performing the functions described above.

BRIEF DESCRIPTION OF THE DRAWINGS

FIG. 2A is a similar view to FIG. 2 of the body/extension connection.

DETAILED DESCRIPTION OF THE PREFERRED EMBODIMENT AND SPECIFICATIONS

Figure 1:
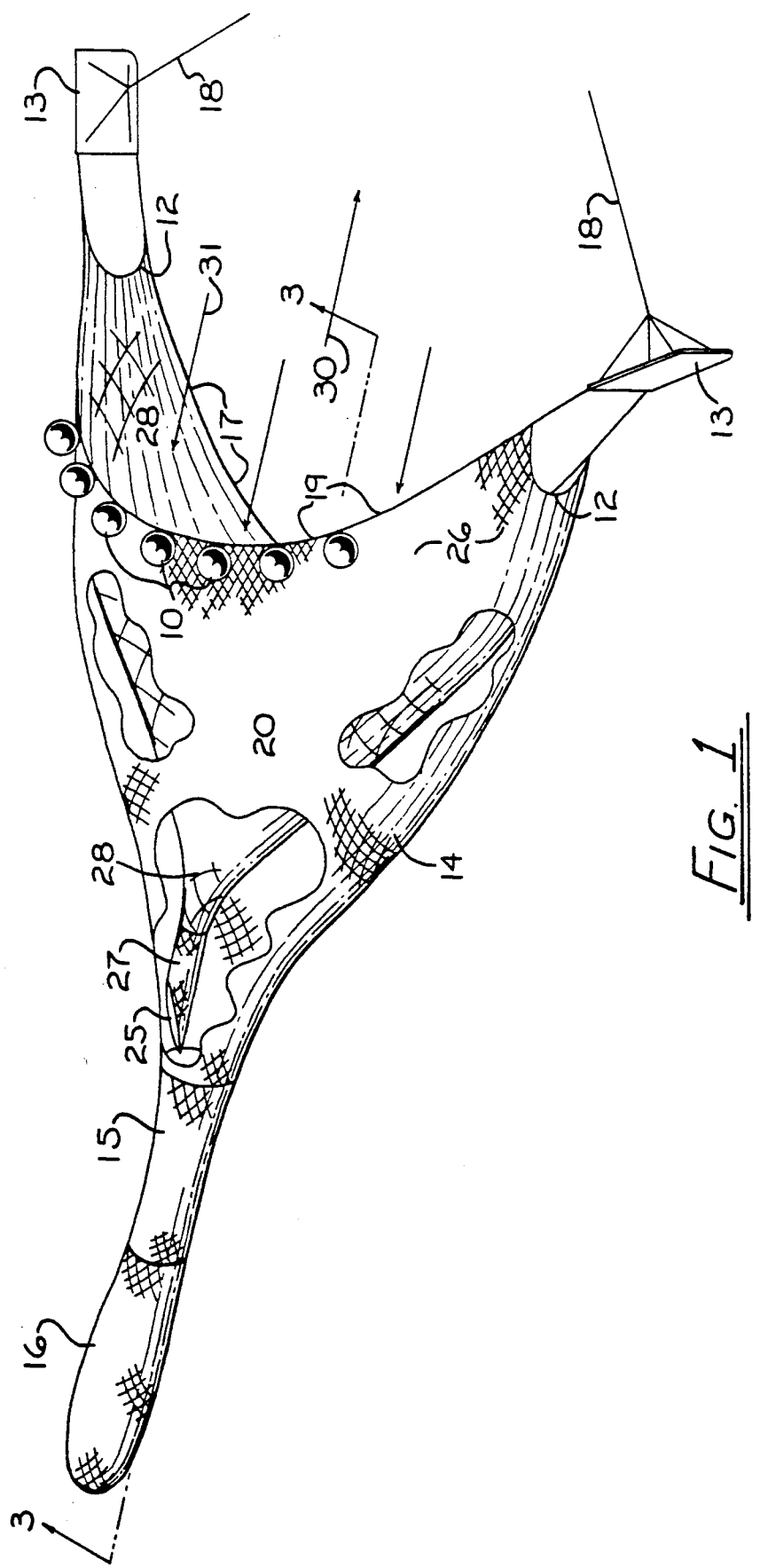
FIG. 1 is an angled view of the current invention, portions of the outer net of said device removed for clarity to show the interrelationship of the various components.

Referring now to the drawings, a fishing trawl device constructed in accordance with the teachings of the present invention is illustrated.

Figure 2:
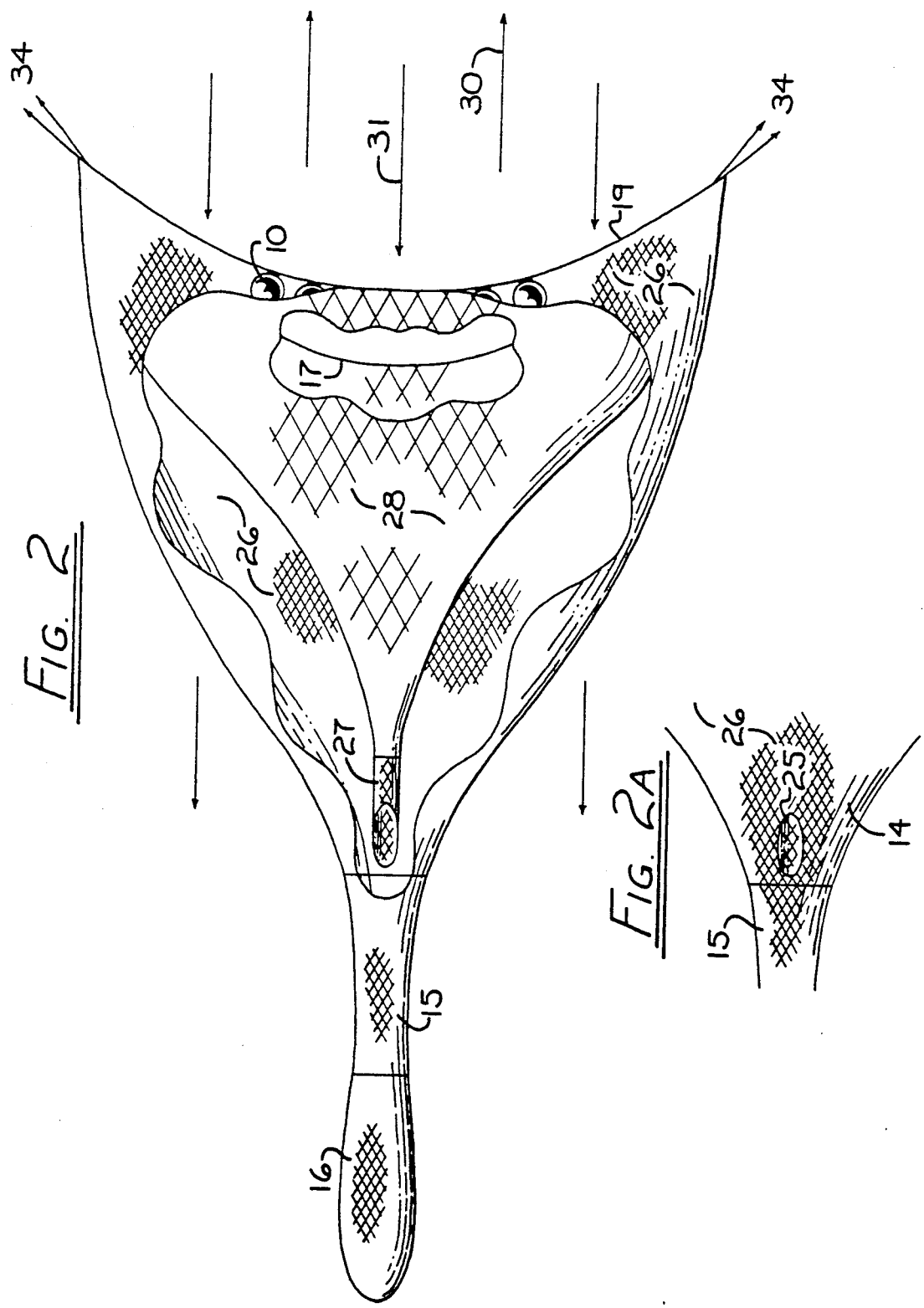
FIG. 2 is a view of the device viewed directly from above, portions of the outer net and inner net removed for clarity to show the interrelationship of the various components.

Referring to FIG. 1 and FIG. 2, the fishing trawl device (20), said device being towed consistent with knowledge commonly available to those proficient in the art of trawling, in the direction of arrow (30) by towing attachments (18). The resultant hydrodynamic force (31) acting on the trawl doors (13) spreads the net and causes it to assume a trailing funnel shape. Said trawling art typically requires the use of a plurality of floats (10), attached to the headrope (19) and a plurality of weights attached to the footrope (17) according to the operators judgment for a desired effect.

Said fishing trawl device differing from the common art by providing outer (26) and inner (28) tubular funnel shaped nets, manufactured of commercially available net material. Said outer (26) and inner (28) nets are joined at the forward extremity (19, 17, 12) near the opening of said fishing trawl device. Said outer net (26) is of a net mesh size as may be necessary or legally prescribed for catching a particular species being harvested, such as shrimp in the preferred embodiment. The inner net (28) is of a net mesh size much larger than the net mesh size of the outer net; as may be necessary or legally prescribed for catching larger unwanted objects of fishery species, such as sea turtles in the preferred embodiment.

The outer (26) and inner (28) nest are joined in the aft central portion of the fishing trawl device body (14) by an inner tubular section (27). Said inner tubular section (27) is constructed of a tubular section of net with a net mesh size the same as the outer net (26). Said inner tubular section (26) can also be formed of an impermeable fabric in place of the net. The after end of the inner tubular section is connected to the perimeter of an opening (25) shown in FIG. 2A in the aft central body (14) of the outer net (26). The forward end of the inner tubular section is connected to the perimeter of the aft central terminus of the inner net (28), thus providing an open tubular passage way from the net mouth through the opening (25).

Figure 3:
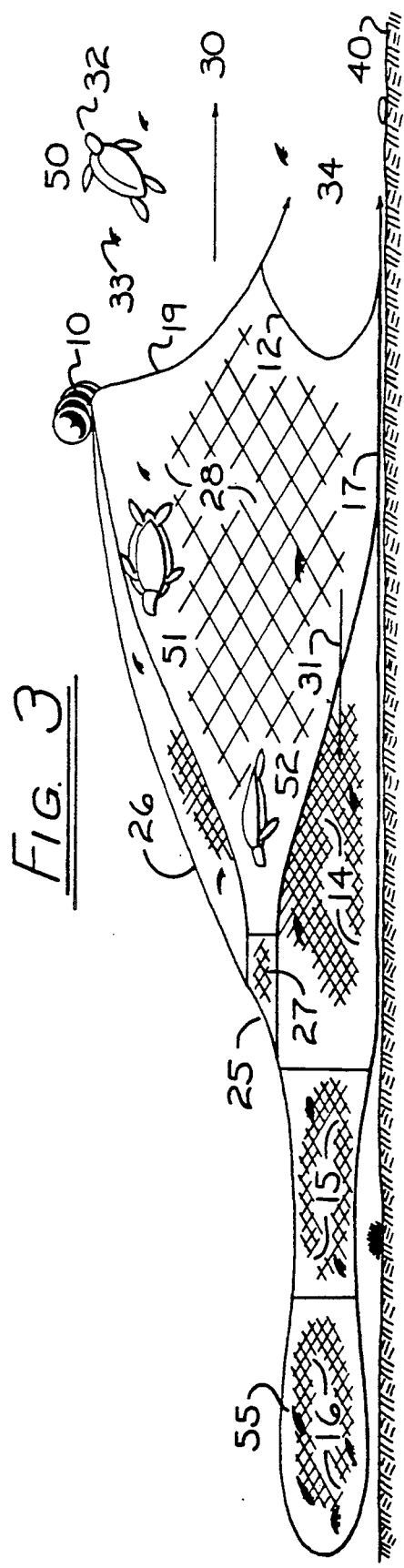
FIG. 3 is a cut away profile view of said device, in the normal stream flow position, showing sea turtles and shrimp encountering the device, the sea turtles and the shrimp not being to exact scale.
Figure 4:
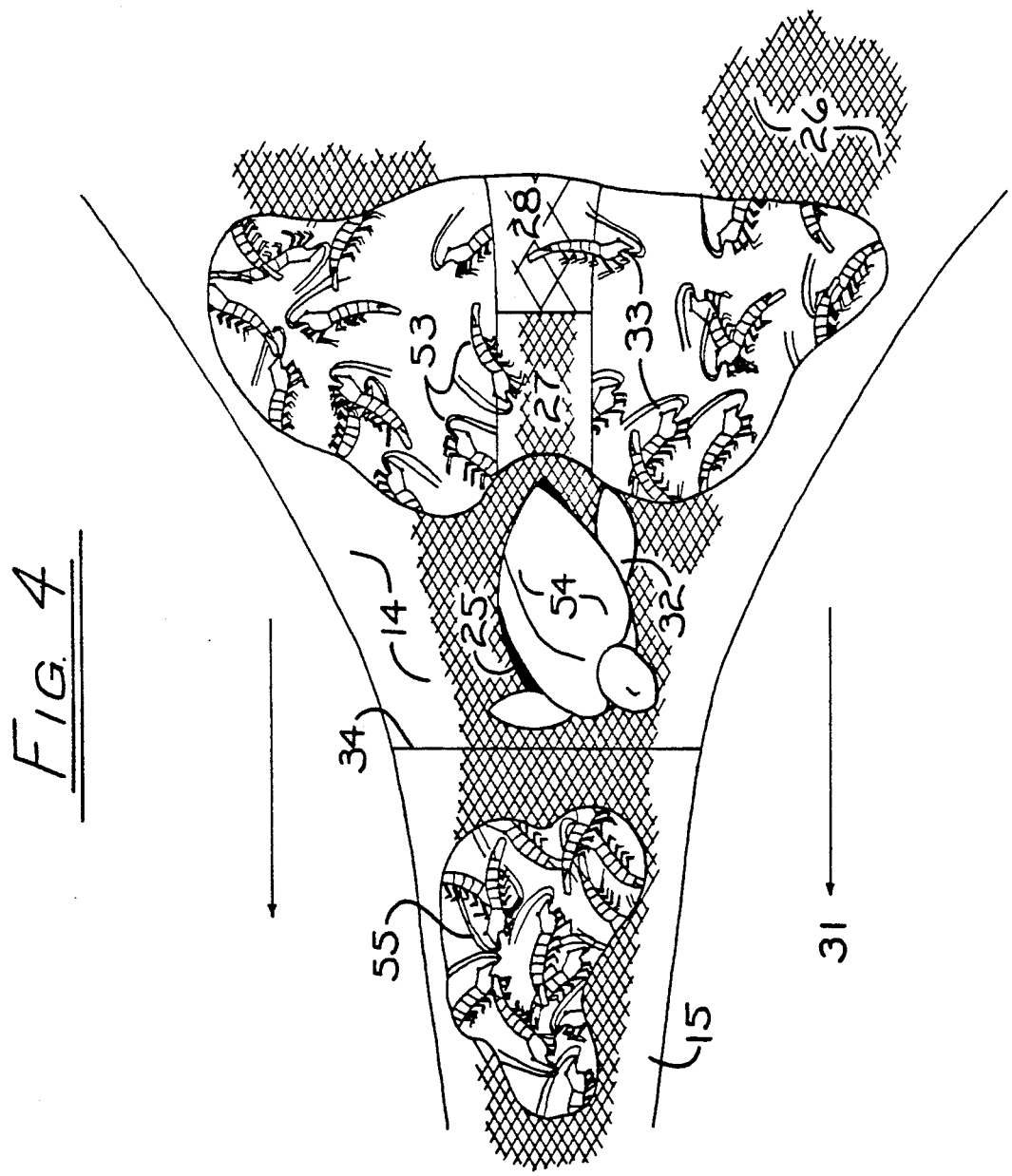
FIG. 4 is a close view of the device viewed directly from above showing the escape of a sea turtle from the opening in the outer net and portions of the outer net removed to show shrimp encountering the inner tubular section of fabric or netting of said device.

Referring now also to FIG. 3, movement of the fishing trawl device (30) with towing attachments previously described (34), along the ocean bottom (40), captures (50) both shrimp (33) and sea turtles (32). Shrimp, being much smaller than the sea turtles, are separated (51) by the water flow (31) and passing through the larger mesh inner net (28), are guided by the smaller mesh outer net (26), through the extension (15), and are collected in the tailbag (16). The sea turtle is forced to follow the inner net (52) and follows a path through the inner tubular section (27) to the opening (25), and passes through the opening (54) in FIG. 4. Shrimp, on the other hand are prevented (53) from passing through the opening (25) by the relative impermeability of the inner tubular section (27) and are forced around the opening (25) for collection (55) in the after portions (15) of the trawl device.

It should be apparent to those skilled in the art that within the general description given, a wide range of embodiments is possible, while still encompassing the basic features and improvements of the current invention, and thus the invention is not restricted to those specific embodiments described but rather the wider range of equivalents encompassed by the claims below.

I claim:

1. A trawling net device comprised of:
    an outer net assembly and an inner net assembly, said outer net assembly and inner net assembly comprising netting material;
    wherein the outer net assembly is comprised of netting material having a tubular funnel shape terminating in an aft collection bag;
    wherein the inner net assembly, having a tubular funnel shape, is comprised of second netting material, said second netting material comprising larger size net meshes relative to the netting material comprising the outer net assembly;
    said outer and inner net assemblies being joined at the forward extremity of said trawling net device;
    said outer and inner net assemblies further joined with an inner tubular section, said inner tubular section joining an opening in the aft end of the inner net assembly and an opening in a central portion of said outer net assembly, said central portion being forward of said aft collection bag;
    said inner tubular section forming a passage between the aft end of the inner net assembly and exterior of said trawling net device;

whereby, by means of trawling stream flow, said inner tubular section and and said inner net assembly exclude species from the aft collection bag which are sized so as to be unable to pass through the meshes of the second netting material, such excluded species being directed through said inner tubular section to the exterior of said trawling device.

2. A trawling net device as recited in claim 1, wherein said inner tubular section is comprised of netting material.

3. A trawling net device as recited in claim 2, wherein said netting material of said inner tubular section comprises smaller size net meshes relative to the inner net assembly.

4. A trawling net device as recited in claim 3, wherein said netting material of said inner tubular section comprises equal or smaller size net meshes relative to the outer net assembly.

5. A trawling net device as recited in claim 23, wherein said inner tubular section is comprised of impermeable fabric.

* * * * *